Oct. 11, 1966  C. M. STORDAHL, JR  3,277,869
ANIMAL WATERING DEVICE
Filed Jan. 4, 1965

INVENTOR
CALMER M. STORDAHL JR.

BY
ATTORNEY

3,277,869
ANIMAL WATERING DEVICE
Calmer M. Stordahl, Jr., 31739 S. Verona Circle, Birmingham, Mich.
Filed Jan. 4, 1965, Ser. No. 423,268
6 Claims. (Cl. 119—81)

This invention relates to a fountain for animals and pets and more particularly to the type which maintains a predetermined quantity of water in a drinking bowl and replenishes it as it is consumed or evaporated.

The utility of a watering device which may be permanently connected to a water supply line and is operative to admit a sufficient quantity of water from that line to a bowl to provide a constant level supply for pets is apparent. Such a device is particularly useful when the animal or pet is to be left for several days without attention. The present invention relates to such a watering device which is simple in design so as to be low in cost and reliable in operation, and which may be simply adjusted to vary the level of water normally maintained in the drinking bowl.

In essence, the preferred embodiment of the present invention which will be subsequently described in detail, employs a drinking bowl which is pivotably supported and connected to a fulcrum arm which extends on the opposite side of the pivotal mount. This arm has an adjustable contact point which presses against a second pivotably mounted arm. A rubber hose which connects the water supply to the bowl passes between this second arm and its pivot support. When a sufficient force is exerted against the second arm to cause it to move against the tube with sufficient force to close off the tube the supply of water to the bowl is halted. When water is removed from the bowl either by consumption or evaporation, the pivot arm exerts a lower pressure on the rubber hose. This results in a flow through the hose which replenishes the water in the bowl.

The basic water level in the bowl may be controlled by positioning the slide contact along the connected fulcrum arm. This varies the effective length of the pivot arm and accordingly adjusts the force which is exerted on the hose by a given volume of water in the bowl.

The entire assembly is designed to be retained within a housing which supports the bowl and the mechanism in a simple and attractive manner.

It is therefore seen to be an object of the present invention to provide an animal watering device wherein a constant water level is maintained in a bowl by connecting the bowl to a water supply line with a rubber hose and applying a fulcrum system which depends upon the weight of the water in the bowl to cut off the flow through the hose when a predetermined water level is obtained.

Another object is to provide such a watering device which employs a multiple fulcrum system and means for adjusting a point of contact between the arms so as to vary the weight of water in the bowl which is required to produce cut off in the hose.

Other objects, advantages, and applications of the present invention will be made apparent by the following detailed description of the preferred embodiment of the invention. The description makes reference to the accompanying drawings in which.

Figure 1:
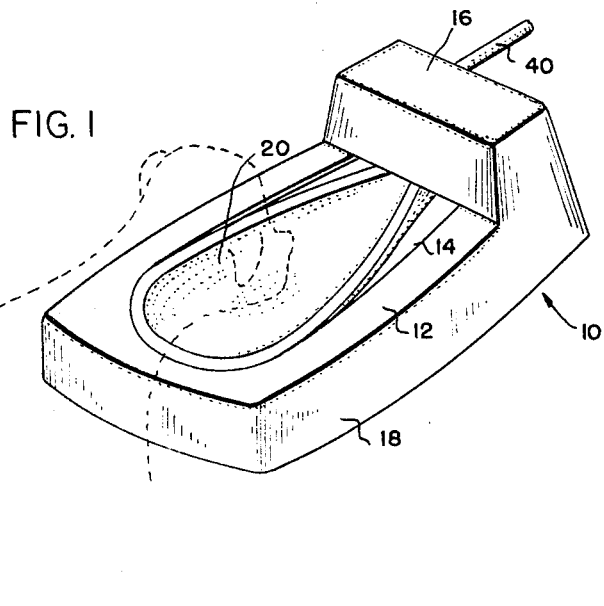
FIGURE 1 is a perspective view of a preferred embodiment of the animal watering device.
Figure 2:
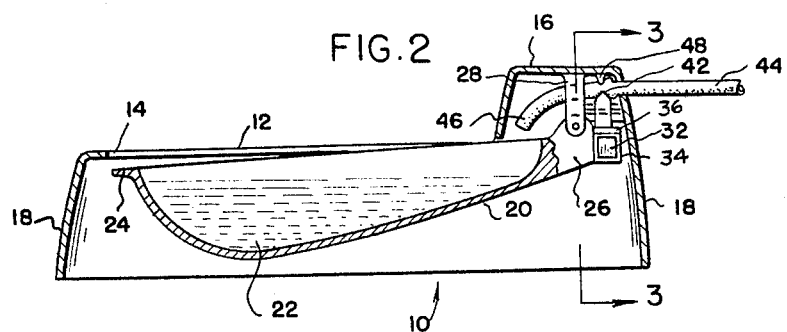
FIGURE 2 is a longitudinal sectional view through the device of FIGURE 1.
Figure 3:
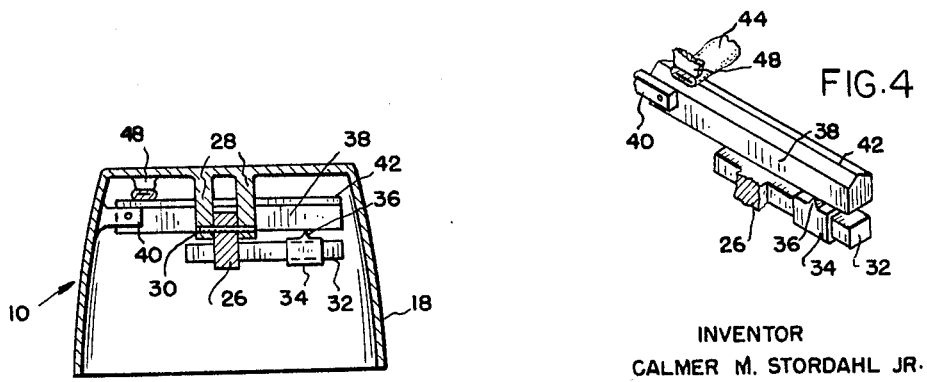
FIGURE 3 is a transverse cross-sectional view taken along line 3—3 of FIGURE 2.
Figure 4:
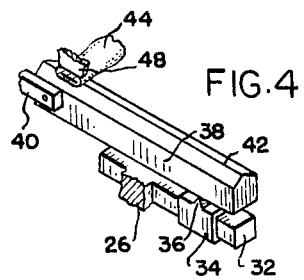
FIGURE 4 is a detailed perspective view of the double fulcrum mechanism and adjustment.

Referring to the drawings, the watering device is supported in a housing generally indicated at 10 which is preferably formed of sheet plastic, by a process such as vacuum forming or injection molding. The housing includes a deck section 12 which has a central elongated aperture 14 formed therein. One end of the housing takes the form of a raised mechanism cover 16. A side panel 18 has a lower edge which acts as a base for the housing.

The bowl or trough 20 of the watering device takes the form of a dished member having a concave upper surface and an outer configuration which generally conforms to the aperture 14 in the housing. The bowl is generally tear-drop shaped with its wide end disposed at the section of the housing opposite to that of the mechanism cover 16. The bowl has a maximum depth at a point 22 adjacent to this forward edge. It also has a horizontal lip 24 about its upper edge to minimize spillage.

The rear end of the bowl 20 terminates within the housing section 16 in a flat trunnion mount 26. This mount is supported between a pair of trunnion bars 28 which are attached to and extend downwardly from the top of the inside of the housing section 16. A pin 30 extends through holes in the bars 28 and the mount 26 so as to pivotably support the bowl 20. A fulcrum arm 32 extends from the trunnion mount in a direction opposite to the bowl. It has an extension in a direction parallel to the axis of the pin 30. The fulcrum arm 32 is preferably square in cross-section and carries a pivot point slide member 34 which has a square hole formed therein. The slide 34 may be manually adjusted along the length of the arm 32. The slide 34 has a pointed member 36 on its upper edge which is adapted to bear against a second fulcrum arm 38.

The arm 38 is supported on the interior of the wall 18 of the housing on the side opposite to that to which the arm 32 projects. A trunnion mount 40 pivotably supports the arm. The arm 32 has a sharpened upper edge 42.

A rubber water supply hose 44 passes through a hole in the side wall 18 of the housing and connects to a pressured source of water (not shown). Its extreme end 46 is disposed above the bowl 20. The hose passes between the upper edge 42 of the arm 38 and a pointed support member 48 which is formed on the under side of the housing section 16. The hose is pinned between these two sections and when a sufficient force is exerted on the arm 38 the hose is cut off so that no water flows through to the bowl from the pressure source.

The force exerted on the hose is thus a function of the force on the lever arm 32, which is in turn proportional to the weight or quantity of water in the bowl 20, and the position of the slide contact 34 along that arm.

In order to use the device the bowl is allowed to fill to the desired level and then the slide 34 is manually moved along the bar 32 till the flow just cuts off. Any further depletion from the bowl will then cause the tube 44 to pass sufficient amount of water to restore the previous balance.

Having thus described my invention, I claim:
1. A watering device for animals, of the type described, comprising: a housing; a stationary member fixed to said housing a mount means pivotably supported to said housing at a point between its ends for motion in a vertical plane; a bowl attached to one end of said mount means; a contact point extending upwardly from an end of a first arm secured normal to the mount means and on an end opposite to that to which the bowl is attached; a second arm pivotably supported to the housing for motion in a vertical plane, said second arm having an exten- sion above the area of the contact point on said first arm; and a water supply tube having one end connected to a source of water and the other end disposed adjacent to said bowl so as to supply water to said bowl, said tube having a section disposed intermediate said stationary member and said second arm, said section being closable by compression, whereby movement of said bowl in a downward direction as a result of the admission of water from said tube causes a transmission of force through said first arm and contact point to said second arm and causes a compressive force to be exerted on the closable tube section so as to prevent further admission of water to the bowl.

2. An animal watering device of the type described, comprising: a housing; a bowl member; a tube member connected at one end to a water supply and having its other end disposed near the bowl so as to admit water from said supply to the bowl; a stationary member secured with the housing in contact with said tube member a mount means having one end attached to said bowl and being pivotably supported to the housing for movement in a vertical plane; a second arm member pivotably secured to the housing for movement in a vertical plane and having one section in contact with said tube member; and contact mechanism connecting said mount means and said second arm in such a manner as to cause the second arm to exert a compressive force on said tube adjacent said stationary member which is a function of the weight of water in said bowl.

3. The device of claim 2 whereby the contact mechanism between said mount means and said second arm may be adjusted to vary the pressure exerted on the tube by a given weight of water in the bowl.

4. The device of claim 2 wherein the contact mechanism between a first arm secured with the mount means and the said second arm consists of a contact member slidably supported on one of said arms so that it may be moved to vary the point of contact between the arms.

5. An animal watering device of the type described, comprising: a housing; a stationary member; a mount means pivotably supported to the housing for motion in a vertical plane; a second arm member pivotably supported to the housing for motion in a vertical plane, said mounting means having a first arm secured thereto, said first arm member and said second arm member having sections paralleling one another; a contact member slidably supported one of the arm members along the section parallel to the other arm member; a water bowl supported on the end of the mount means opposite to that containing the section extending parallel to the second arm member; a flexible conduit connected to a water supply and operative to supply water to said bowl, said tube having a section disposed intermediate said stationary member and said second arm member; and movement of said second arm member operative to terminate the water flow by a compressive force on said conduit; said second arm movement dependent upon movement of said first arm and a function of the weight of the water in the bowl.

6. The device of claim 5, wherein movement of said slidable contact member varies the mechanical advantage of the system.

References Cited by the Examiner
UNITED STATES PATENTS

| | | | |
|---|---|---|---|
| 638,842 | 12/1899 | Glenn | 119—81 |
| 1,059,849 | 4/1913 | Ely | 119—81 |

SAMUEL KOREN, *Primary Examiner.*

HUGH R. CHAMBLEE, *Examiner.*